United States Patent
Bowen et al.

(10) Patent No.: US 9,967,530 B2
(45) Date of Patent: May 8, 2018

(54) IMAGE STABILIZATION AND SKEW CORRECTION FOR PROJECTION DEVICES

(71) Applicant: AT&T Intellectual Property I, L.P., Atlanta, GA (US)

(72) Inventors: Donald Bowen, Madison, NJ (US); Robert R. Miller, II, Convent Station, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days. days.

(21) Appl. No.: 14/568,594

(22) Filed: Dec. 12, 2014

(65) Prior Publication Data
US 2015/0098064 A1 Apr. 9, 2015

Related U.S. Application Data

(63) Continuation of application No. 12/829,866, filed on Jul. 2, 2010, now Pat. No. 8,919,965.

(51) Int. Cl.
*H04N 9/31* (2006.01)
*G03B 21/14* (2006.01)

(52) U.S. Cl.
CPC ......... *H04N 9/3185* (2013.01); *G03B 21/147* (2013.01); *H04N 9/3129* (2013.01); *H04N 9/3173* (2013.01); *H04N 9/3194* (2013.01)

(58) Field of Classification Search
CPC .. H04N 9/3185; H04N 9/3194; H04N 9/3179; H04N 9/3182; H04N 9/3188
See application file for complete search history.

(56) References Cited

U.S. PATENT DOCUMENTS

| | | | |
|---|---|---|---|
| 6,056,408 A | 5/2000 | Kobayashi | |
| 7,201,482 B2 | 4/2007 | Tamura | |
| 7,213,926 B2 | 5/2007 | May et al. | |
| 7,284,866 B2 * | 10/2007 | Buchmann | G02B 26/0816 353/121 |
| 7,344,253 B2 | 3/2008 | Tamura | |
| 7,380,722 B2 | 6/2008 | Harley et al. | |
| 7,632,185 B2 | 12/2009 | Solomon et al. | |
| 7,661,825 B2 * | 2/2010 | Nishida | G03B 21/14 353/69 |

(Continued)

OTHER PUBLICATIONS

Microvision ShowWX Laser Pico Projector Displays, http://www.microvision.com/pico_projector_displays/, printed Jul. 2, 2010, 1 page.

(Continued)

*Primary Examiner* — Bao-Luan Le
(74) *Attorney, Agent, or Firm* — Hartman & Cirtin LLC

(57) ABSTRACT

Methods, systems, and computer-readable media for generating a projected image are provided. Movement measurements are received from an accelerometer within a projection device. A determination is made as to whether the movement measurements indicate movement of the projection device. Upon determining that the movement measurements indicate movement of the projection device, a movement correction factor is determined based on the movement measurements to compensate for the movement of the projection device. The projection device is caused to generate a projected image according to the movement correction factor.

14 Claims, 7 Drawing Sheets

(56) References Cited

U.S. PATENT DOCUMENTS

| | | | |
|---|---|---|---|
| 7,690,797 B2 * | 4/2010 | Higashi | G03B 21/53 353/101 |
| 7,692,604 B2 | 4/2010 | Yokote et al. | |
| 7,857,460 B2 | 12/2010 | Klosowiak et al. | |
| 7,988,304 B2 | 8/2011 | Yamamoto et al. | |
| 8,009,929 B2 | 8/2011 | Sakurai | |
| 8,297,757 B2 | 10/2012 | Kubota | |
| 8,322,863 B1 | 12/2012 | Cho et al. | |
| 8,382,291 B2 | 2/2013 | Kubota | |
| 8,554,273 B2 * | 10/2013 | Osaka | G03B 17/54 455/550.1 |
| 8,833,948 B2 * | 9/2014 | Osaka | G03B 21/00 348/586 |
| 2003/0038927 A1 | 2/2003 | Alden | |
| 2003/0038928 A1 | 2/2003 | Alden | |
| 2005/0099607 A1 | 5/2005 | Yokote et al. | |
| 2006/0103811 A1 | 5/2006 | May et al. | |
| 2006/0146015 A1 * | 7/2006 | Buchmann | G02B 26/0816 345/156 |
| 2006/0256298 A1 | 11/2006 | Knipe | |
| 2006/0285089 A1 * | 12/2006 | Higashi | G03B 21/53 353/101 |
| 2006/0290896 A1 * | 12/2006 | Nishida | G03B 21/14 353/69 |
| 2008/0252860 A1 | 10/2008 | Matsumoto et al. | |
| 2009/0079945 A1 | 3/2009 | Klosowiak et al. | |
| 2010/0103385 A1 | 4/2010 | Kubota | |
| 2010/0103386 A1 | 4/2010 | Kubota | |
| 2011/0216288 A1 | 9/2011 | Rutledge et al. | |
| 2011/0304833 A1 * | 12/2011 | Osaka | G03B 21/00 353/85 |

OTHER PUBLICATIONS

Sensors and MEMS—Motion Sensors (MEMS)—STMicroelectronics, http://www.st.com/stonline/products/families/sensors/motion_sensors.htm, printed Jul. 2, 2010, 2 pages.

Gyroscopes—STMicroelectronics, http://www.st.com/stonline/products/families/sensors/gyroscopes.htm, printed Jul. 2, 2010, 2 pages.

U.S. Office Action dated May 25, 2012 in U.S. Appl. No. 12/829,866.

U.S. Office Action dated Dec. 20, 2012 in U.S. Appl. No. 12/829,866.

U.S. Notice of Allowance dated Jul. 31, 2014 in U.S. Appl. No. 12/829,866.

* cited by examiner

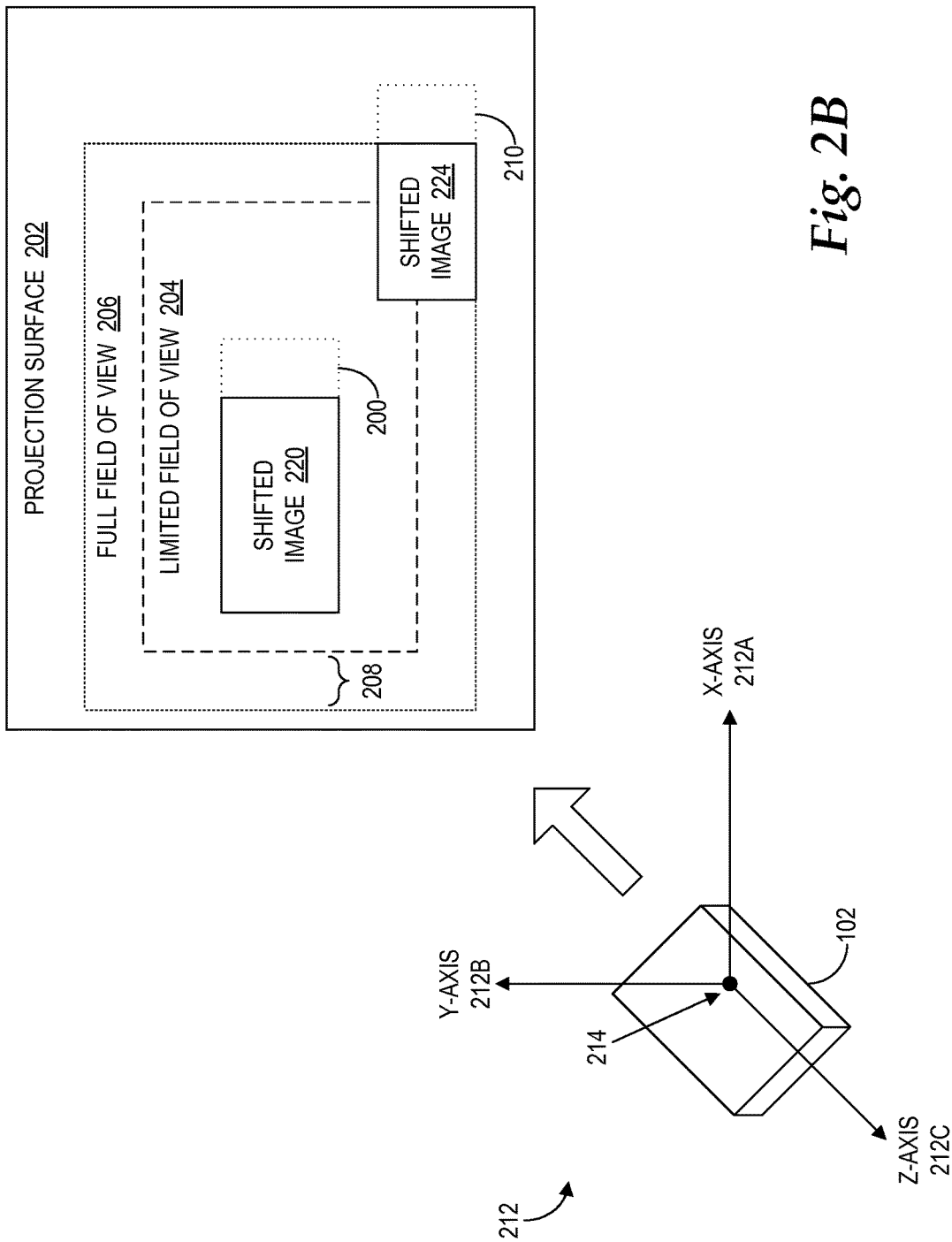

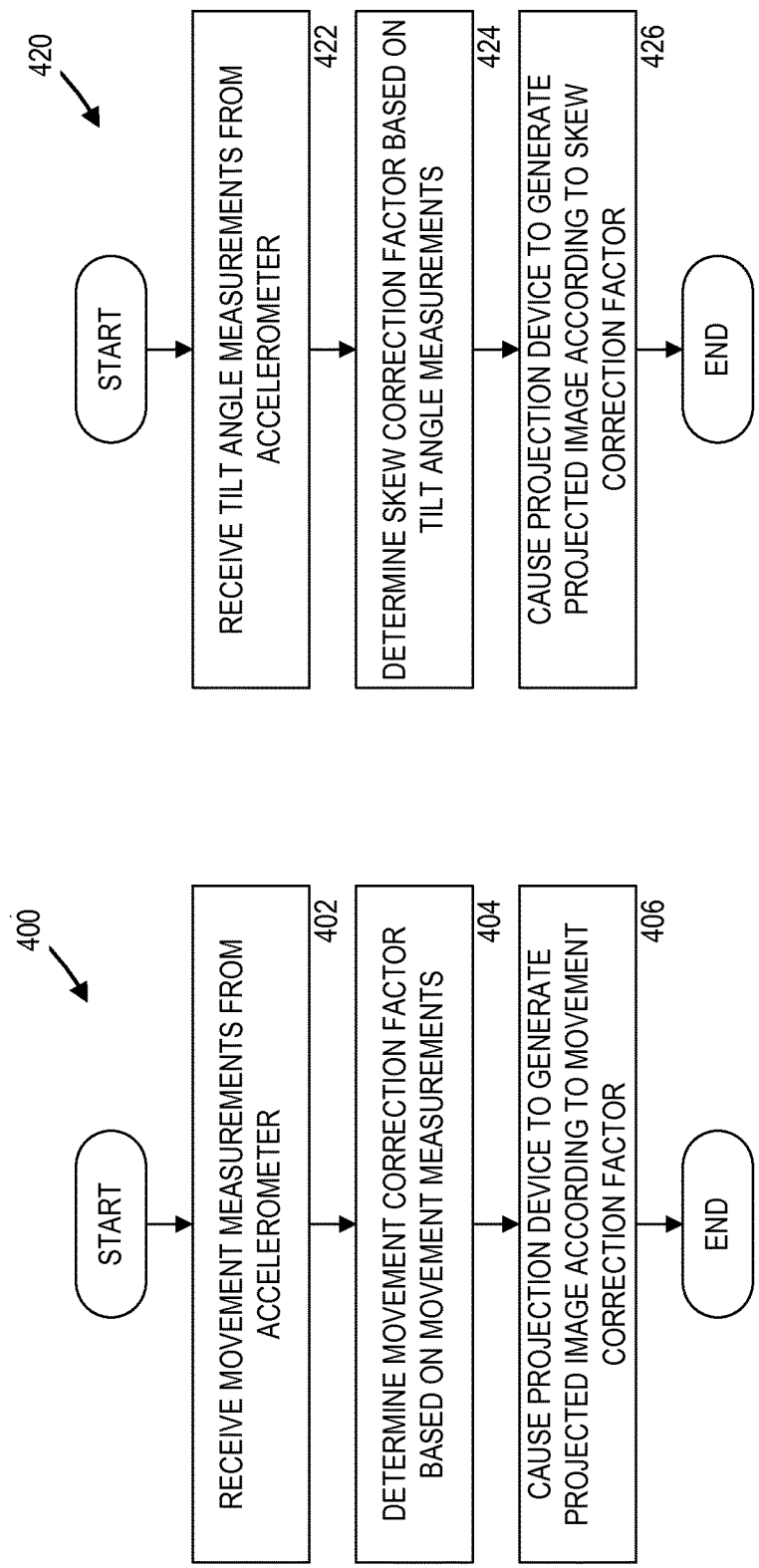

IMAGE STABILIZATION AND SKEW CORRECTION FOR PROJECTION DEVICES

CROSS-REFERENCE TO RELATED APPLICATIONS

This application is a continuation of and claims priority to U.S. patent application Ser. No. 12/829,866, filed Jul. 2, 2010, now U.S. Pat. No. 8,919,965, the entire contents of which are herein incorporated by reference.

BACKGROUND

This application relates generally to the field of projection devices. More specifically, the disclosure provided herein relates to providing image stabilization and skew correction for projection devices.

Projection devices are designed to display content on a projection screen or other vertical projection surface (e.g., a wall). For example, projection devices are often utilized to display images and/or video. A conventional projection device may include a light source, an optical modulator, and a projection lens. The optical modulator may form an image by modulating a light beam emitted from the light source in accordance with given image information. The projection lens may then enlarge and project the image formed by the optical modulator.

Projection devices can vary significantly in size. Tabletop projection devices can be bulky and/or heavy devices. Due to the size and weight of tabletop projection devices, tabletop projection devices are typically situated on a relatively stable surface, such as a table, stand, or mount. Since a presumption is made that tabletop projection devices are operated from the stable surface, tabletop projection devices typically do not include image stabilization features.

In contrast to tabletop projection devices, handheld projection devices are typically lightweight and portable. A user can simply point a handheld projection device against a projection surface in order to project an image on the projection surface. However, the user cannot be expected to hold the handheld projection device steady for a substantial period of time. Thus, as the user fatigues, the user's hand may shake, and the corresponding projected image may become jittery and unviewable. The position and orientation of a handheld projection device with respect to the projection screen may also create other unintended image distortions that reduce the quality of the projected image.

SUMMARY

Embodiments of the disclosure presented herein include methods, systems, and computer-readable media for generating a projected image. According to one aspect, a method for generating a projected image is provided. According to the method, movement measurements are received from an accelerometer within a projection device. A determination is made as to whether the movement measurements indicate movement of the projection device. Upon determining that the movement measurements indicate movement of the projection device, a movement correction factor is determined based on the movement measurements to compensate for the movement of the projection device. The projection device is caused to generate a projected image according to the movement correction factor.

According to another aspect, a system for generating a projected image is provided. The system includes a memory and a processor functionally coupled to the memory. The memory stores a program containing code for generating the projected image. The processor is responsive to computer-executable instructions contained in the program and configured to perform the following operations. Movement measurements are received from an accelerometer within a projection device. A determination is made as to whether the movement measurements indicate movement of the projection device. Upon determining that the movement measurements indicate movement of the projection device, a movement correction factor is determined based on the movement measurements to compensate for the movement of the projection device. The projection device is caused to generate a projected image according to the movement correction factor.

According to yet another aspect, a computer-readable medium having instructions stored thereon for execution by a processor to perform a method for generating a projected image is provided. According to the method, movement measurements are received from an accelerometer within a projection device. A determination is made as to whether the movement measurements indicate movement of the projection device. Upon determining that the movement measurements indicate movement of the projection device, a movement correction factor is determined based on the movement measurements to compensate for the movement of the projection device. The projection device is caused to generate a projected image according to the movement correction factor.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 2B shows a shifted image created by the handheld projection device, in accordance with some embodiments.

FIGS. 4A and 4B are flow diagrams illustrating example methods for generating a projected image, in accordance with some embodiments.

DETAILED DESCRIPTION

The following detailed description is directed to methods, systems, and computer-readable media for providing image stabilization and skew correction in projection devices. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
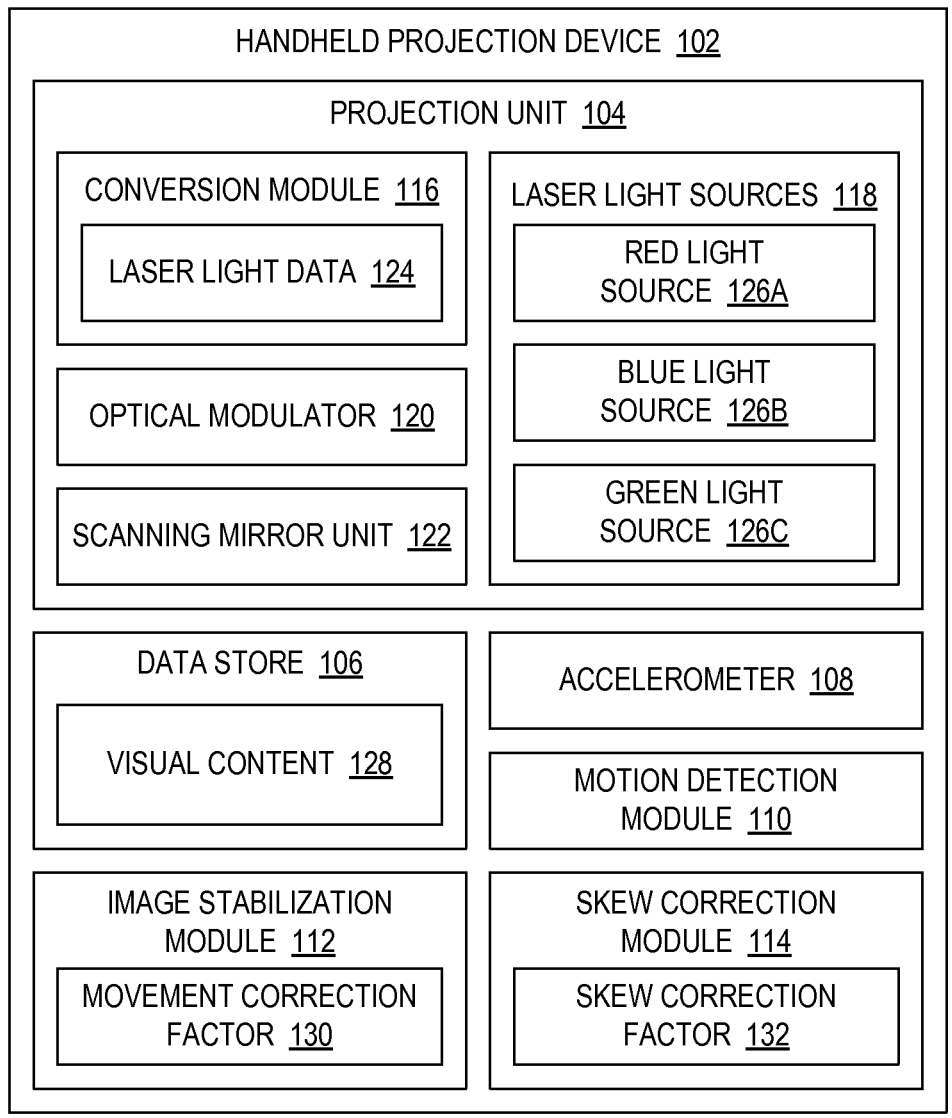
FIG. 1 is an example block diagram illustrating a handheld projection device configured to provide image stabilization and skew correction, in accordance with some embodiments.

In the following detailed description, references are made to the accompanying drawings that form a part hereof, and which are shown by way of illustration, specific embodiments, or examples. Referring now to the drawings, in which like numerals represent like elements through the several figures, FIG. 1 is an example block diagram illustrating a handheld projection device 102 configured to provide image stabilization and skew correction, in accordance with some embodiments. The handheld projection device 102 may include a projection unit 104, a data store 106, an accelerometer 108, a motion detection module 110, an image stabilization module 112, and a skew correction module 114. The projection unit 104 may include a conversion module 116, laser light sources 118, an optical modulator 120, and a scanning mirror unit 122.

The conversion module 116 may include laser light data 124. The laser light sources 118 may include a red light source 126A, a blue light source 126B, and a green light source 126C. The data store 106 may store visual content 128. It should be appreciated that technologies for image stabilization and skew correction described herein may also be implemented in tabletop projection devices and other non-handheld projection devices. As used herein, a projection device may refer to any suitable device adapted to emit a light onto a projection surface, such as a projection screen or a wall, thereby displaying an image on the projection surface. Examples of projection devices may include, but are not limited to, video projectors, movie projectors, slide projectors, and overhead projectors.

According to some embodiments, the data store 106 may provide the visual content 128 to the projection unit 104, and in particular, to the conversion module 116. The visual content 128 may include still images and/or moving images (i.e., video). Upon receiving the visual content 128, the conversion module 116 may generate the laser light data 124 based on the visual content 128. The laser light data 124 may contain instructions for operating the laser light sources 118 in order to reproduce the visual content 128. For example, the laser light data 124 may select various colors and/or intensities of the laser light sources 118.

The laser light sources 118 may include multiple laser light sources, each of which corresponds to a given color. For example, the laser light sources 118 may include the red laser light source 126A, the blue laser light source 126B, and the green laser light source 126C. Through the utilization of the laser light data 124, the projection unit 104 can control the operation of the red laser light source 126A, the blue laser light source 126B, and the green laser light source 126C. By varying the selection and the intensity of the red laser light source 126A, the blue laser light source 126B, and the green laser light source 126C, the projection unit 104 can generate a broad array of colors utilizing the red-green-blue ("RGB") color model. It should be appreciated that other colors and arrangements of laser light sources and other color models may be similarly implemented.

The laser light sources 118 may generate multiple light paths. For example, the red laser light source 126A, the blue laser light source 126B, and the green laser light source 126C may each generate a separate light path. The laser light sources 118 may direct the multiple light paths to the optical modulator 120. The optical modulator 120 may combine the multiple light paths from the laser light sources 118 in order to generate a single modulated light path.

The optical modulator 120 may direct the modulated light path to the scanning mirror unit 122. The scanning mirror unit 122 may include a small mirror within a micro electromechanical systems ("MEMS") device. The scanning mirror unit 122 may be configured to oscillate the small mirror horizontally and/or vertically in order to scan from left-to-right and top-to-bottom or in some other suitable configuration. As the optical modulator 120 directs the modulated light path to the small mirror, the scanning mirror unit 122 may reproduce the visual content 128 pixel by pixel by reflecting the modulated light path off the oscillating small mirror. Since lasers can render precise points without external optics, the projection unit 104 can project an image without a lens and without the need to focus the lens. Further, the laser light sources 118 may consume significantly less power over conventional projection device implementations that utilize high-intensity light bulbs.

Generally, handheld projection devices, such as the handheld projection device 102, have a small and lightweight form factor and are designed to be held and operated in a human user's hand. One of the challenges faced by the user is the ability to steadily hold the handheld projection device 102, especially when the visual content 128 has a lengthy duration. As the user's hand fatigues, the user's hand may begin to move or shake, potentially resulting in an inconsistent or jittery projected image.

In order to address the inconsistent or jittery projected image caused by user fatigue, the handheld projection device 102 may implement the accelerometer 108, the motion detection module 110, and the image stabilization module 112 in various embodiments. In some embodiments, the accelerometer 108 is a solid state three-axis accelerometer. In further embodiments, the accelerometer 108 may include one or more suitable accelerometers including single-axis and/or multi-axis accelerometers. The accelerometer 108 may be positioned in any suitable location within the handheld projection device 102. For example, the accelerometer 108 may be positioned next to or near the laser light sources 118. The accelerometer 108 may be configured to measure a magnitude of acceleration and a direction of the acceleration.

The motion detection module 110 may monitor the magnitude and direction of acceleration measured by the accelerometer 108 in order to detect movement. As the user's hand moves, the accelerometer 108 may detect acceleration of the handheld projection device 102. When the motion detection module 110 detects any acceleration or acceleration above some acceleration threshold, the motion detection module 110 may identify this acceleration as movement of the handheld projection device 102. Upon identifying movement of the handheld projection device 102, the motion detection module 110 may determine a distance of the movement.

The motion detection module 110 may then initiate the image stabilization module 112. The image stabilization module 112 may generate the movement correction factor 130. The movement correction factor 130 may cause the scanning mirror unit 122 to reproduce the visual content 128 in a manner that compensates for the detected movement in accordance with the distance and direction of the movement. Additional details regarding the operation of the image stabilization module 112 will be described in greater detail below with reference to FIGS. 2A, 2B, and 2C.

Another challenge commonly faced by users of handheld projection devices, such as the handheld projection device 102, is trapezoidal skew caused when the orientation of the handheld projection device 102 is tilted with respect to the projection surface. When the handheld projection device 102 is tilted with respect to the projection surface, the handheld projection device 102 is pointed towards the projection surface at an angle other than directly perpendicular to the projection surface. This angle may cause distortion of the projected image.

In order to address distortion of the projected image resulting from trapezoidal skew, the handheld projection device 102 may further implement the skew correction module 114 in various embodiments. The accelerometer 108 may further be configured to measure a tilt angle of the handheld projection device 102 with reference to a given axis. The motion detection module 110 may monitor the tilt angle measured by the accelerometer 108 to determine the orientation of the handheld projection device 102 with respect to a projection surface.

When the motion detection module 110 detects that the measured tilt indicates that the handheld projection device 102 is not pointed towards the projection surface at an angle directly perpendicular to the projection surface, the motion detection module 110 may initiate the skew correction module 114. The skew correction module 114 may generate the skew correction factor 132. The skew correction factor 132 may cause the scanning mirror unit 122 to reproduce the visual content 128 in a manner that compensates for the trapezoidal skew in the projected image. Additional details regarding the operation of the skew correction module 114 will be described in greater detail below with reference to FIGS. 3A and 3B.

It should be appreciated that the measurements from the accelerometer 108 may be supplemented with additional measurements from a gyroscope (not shown), such as microgyroscope. The gyroscope may be configured to measure rotation on a plane about a fixed point. For example, if the handheld projection device 102 is positioned on a given point and rotates on the given point, the accelerometer 108 may not be able to detect the angular rotation because there is no linear motion. However, a gyroscope collocated with the given point can measure such angular rotation. The combination of the accelerometer 108 and the gyroscope can provide more data points from which the motion detection module 110 can detect movement of the handheld projection device 102.

In some embodiments, the image stabilization module 112 and/or the skew correction module 114 may be enabled and disabled as necessary on the handheld projection device 102. For example, if a user holding the handheld projection device 102 is on the same platform as the projection surface, jostling of the platform may cause both the user and the projection surface to move in a similar manner. In such cases, a user may want to disable the image stabilization module 112 and/or the skew correction module 114 so that the projected image continues to follow the projection surface.

Figure 2A:
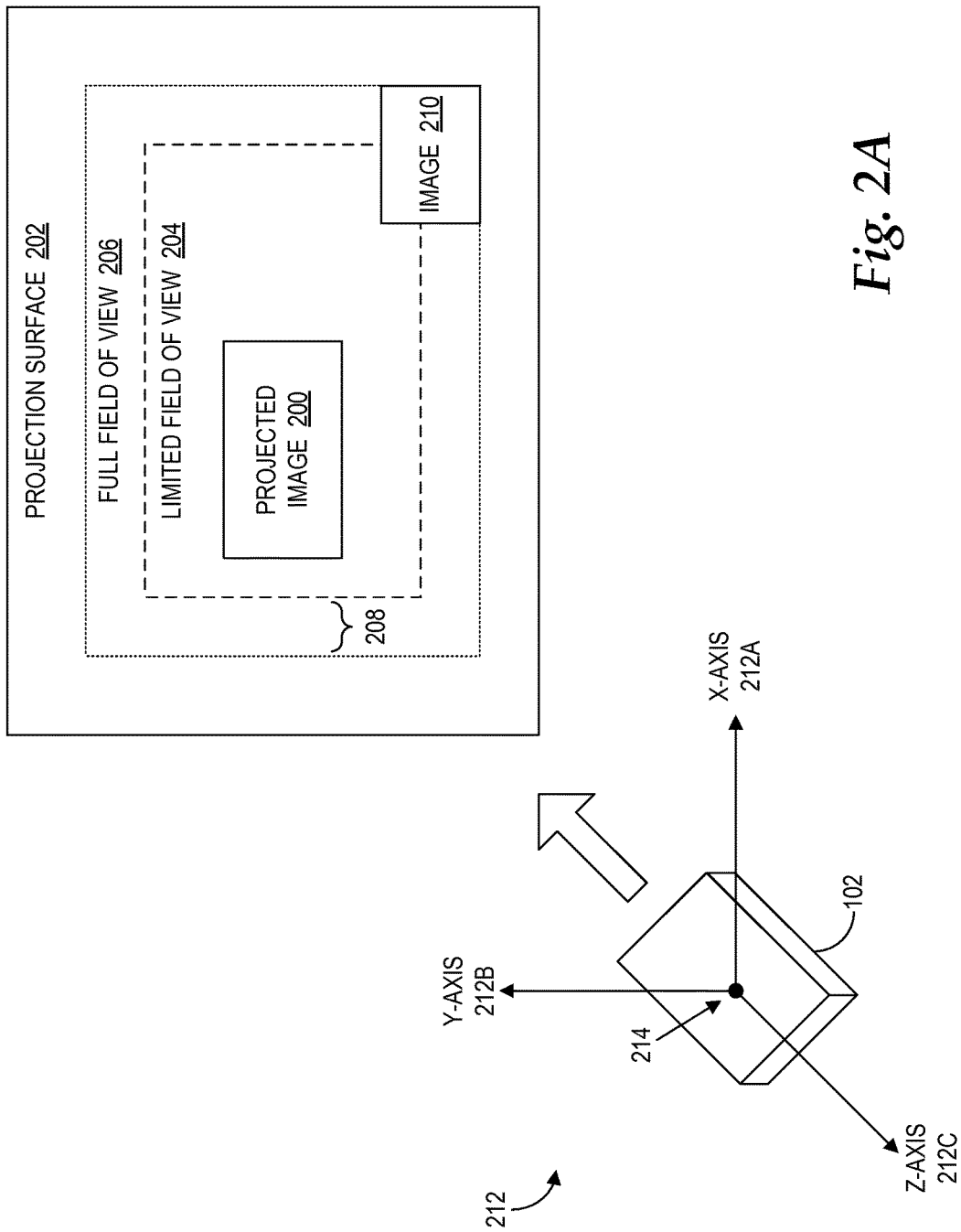
FIG. 2A shows a projected image created by the handheld projection device, in accordance with some embodiments.
Figure 2C:
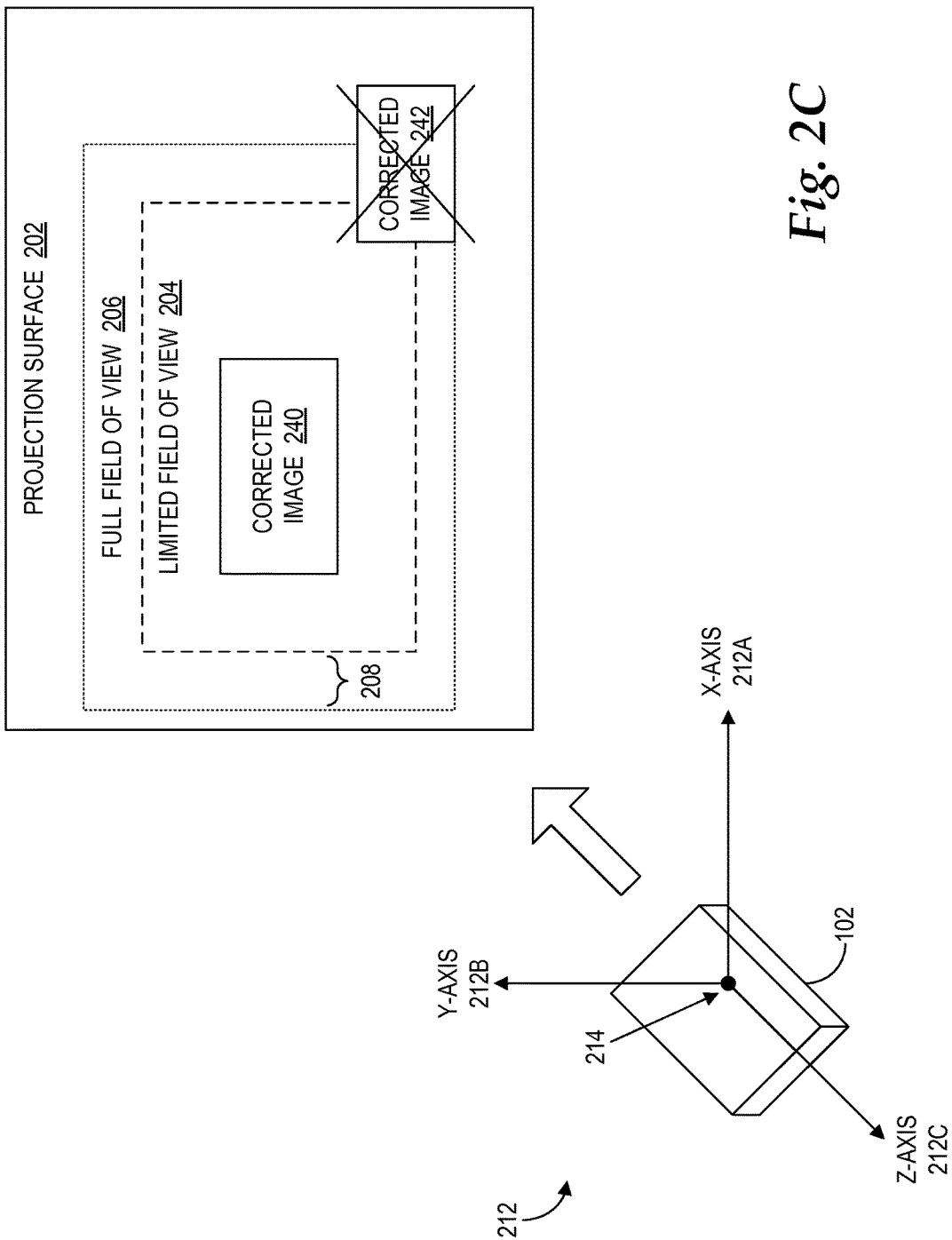
FIG. 2C shows a corrected image created by the handheld projection device, in accordance with some embodiments.

Referring now to FIGS. 2A, 2B, and 2C, additional details will be provided regarding the operation of the image stabilization module 112. In particular, FIGS. 2A, 2B, and 2C show an illustrative sequence whereby the image stabilization module 112 corrects image jitter caused by movement of the handheld projection device 102. FIG. 2A shows a projected image 200 created by the handheld projection device 102, in accordance with some embodiments. FIG. 2B shows a shifted image 220 created by the handheld projection device 102, in accordance with some embodiments. FIG. 2C shows a corrected image 240 created by the handheld projection device 102, in accordance with some embodiments.

In FIG. 2A, the handheld projection device 102 generates the projected image 200 on a projection surface 202. A dashed line represents a limited field of view 204 projected by the handheld projection device 102. In the example illustrated in FIG. 2A, the projected image 200 is positioned in the left side of the limited field of view 204. A dotted line represents a full field of view 206 capable of being projected by the handheld projection device 102. An area between the limited field of view 204 and the full field of view 206 represents an error tolerance 208.

Although the handheld projection device 102 may be capable of projecting the full field of view 206, the handheld projection device 102 may reduce the full field of view 206 into the limited field of view 204. By reducing the full field of view 206 into the limited field of view 204, the handheld projection device 102 can provide corrections when the projected image 200 shifts. In order to more clearly illustrate the purpose of the limited field of view 204, an illustrative example is shown in FIG. 2A where the handheld projection device 102 also generates a second projected image 210. The second projected image 210 is outside of the limited field view 204 but within the full field of view 206.

In an illustrative example, when the handheld projection device 102 generates the projected image 200, the accelerometer 108 does not detect any acceleration or does not detect acceleration above some acceleration threshold for a given period of time (e.g., two or three seconds). In some embodiments, the motion detection module 110 establishes a baseline when the accelerometer 108 does not detect any acceleration or does not detect acceleration above some acceleration threshold for the given period of time. When the accelerometer 108 detects acceleration or acceleration above the acceleration threshold after the baseline has been established, the motion detection module 110 may identify this detected acceleration as movement of the handheld projection device 102. Upon identifying movement of the handheld projection device 102, the motion detection module 110 may determine a distance of the movement and identify a direction of the movement. The motion detection module 110 may then initiate the image stabilization module 112.

As illustrated in FIG. 2A, the handheld projection device 102 is shown in relation to a Cartesian coordinate system 212 including an X-axis 212A, a Y-axis 212B, and a Z-Axis 212C. The X-axis 212A, the Y-axis 212B, and the Z-Axis 212C intersect at an origin point 214. In the example illustrated in FIG. 2A, the origin point 214 is shown in the center of the handheld projection device 102. The center of the handheld projection device 102 may represent a baseline location after the baseline has been established. For illustrative purposes, movements of the handheld projection device 102 will described herein with reference to the Cartesian coordinate system 212. However, it should be appreciated that movements of the handheld projection device 102 may be similarly described with reference to other coordinate systems, such as a polar coordinate system.

In FIG. 2B, the handheld projection device 102 generates the shifted image 220 on a projection surface 202. The shifted image 220 represents a shift in the projected image 200 when the handheld projection device 102 has moved from the baseline location. Movement of the handheld projection device 102 can cause an unintended transition from the projected image 200 to the shifted image 220. A viewer may see this unintended transition as image jitter. In order to more clearly illustrate the position of the shifted image 220, an outline of the projected image 200 is shown in FIG. 2B. In the example illustrated in FIG. 2B, the handheld projection device 102 has moved left along the X-axis 212A, as indicated by a shift of the origin point 214 to the right side of the handheld projection device 102. As a result, the shifted image 220 is positioned to the left of the projected image 200.

Also as illustrated in FIG. 2B, the handheld projection device 102 also generates a second shifted image 224 on the projection surface 202. The second shifted image 224 represents a shift in the second projected image 210 when the handheld projection device 102 has moved from the baseline location. In order to more clearly illustrate the position of the second shifted image 224, an outline of the second projected image 210 is shown in FIG. 2B.

In FIG. 2C, the handheld projection device 102 generates a corrected image 240. The handheld projection device 102 projects the corrected image 240 on the projection surface 202 in the same position as the projected image 200, even though the handheld projection device 102 has been moved. Thus, the corrected image 240 is positioned closer to the center of the limited field of view 204, whereas the shifted image 220 is positioned to the left side of the limited field of view 204. The corrected image 240 may represent a correction of the shifted image 220 according to the movement correction factor 130.

The image stabilization module 112 may determine the movement correction factor 130 based on the movement of the handheld projection device 102. In particular, the movement correction factor 130 may compensate for the distance of the movement and the direction of the movement from the baseline location as determined by the motion detection module 110. That is, the movement correction factor 130 may cause the scanning mirror unit 122 to reproduce a corresponding projected image in a manner as if the handheld projection device 102 were positioned at the baseline location.

In the example illustrated in FIG. 2C, the handheld projection device 102 generates the corrected image 240 on the projection surface 202 in the same position as the projected image 200. Movement of the handheld projection device 102 can cause the unintended transition from the projected image 200 to the corrected image 240. However, since the projected image 200 and the corrected image 240 are in the same position on the projection surface 202, a viewer will not see any image jitter. The image stabilization module 112 may continuously correct small movements of the handheld projection device 102 utilizing the previously described technologies. In some embodiments, the image stabilization module 112 may correct small movements of the handheld projection device 102 in real-time or near real-time.

Also as illustrated in FIG. 2C, the handheld projection device 102 cannot generate the second corrected image 242 on the projection surface 202. In this case, the second corrected image 242 would be outside of the full field of view 206 of the handheld projection device 102. By reducing the full field of view 206 into the limited field of view 204, the handheld projection device 102 can utilize the error tolerance 208 in order to correct a corresponding shifted projected image, such as the shifted image 220. In some embodiments, the image stabilization module 112 may utilize a suitable edge detection technology to determine the location of the projected image 200 with respect to the full field of view 206. The image stabilization module 112 may dynamically adjust the limited field of view 204 based on the determined location of the projected image 200. In further embodiments, the image stabilization module 112 may generate the corrected image 240 only when the corrected image 240 would be within the full field of view 204. In cases where the corrected image 240 would not be within the full field of view 204, the image stabilization module 112 may allow the transition from the projected image 200 to the shifted image 220 without correction.

Figure 3B:
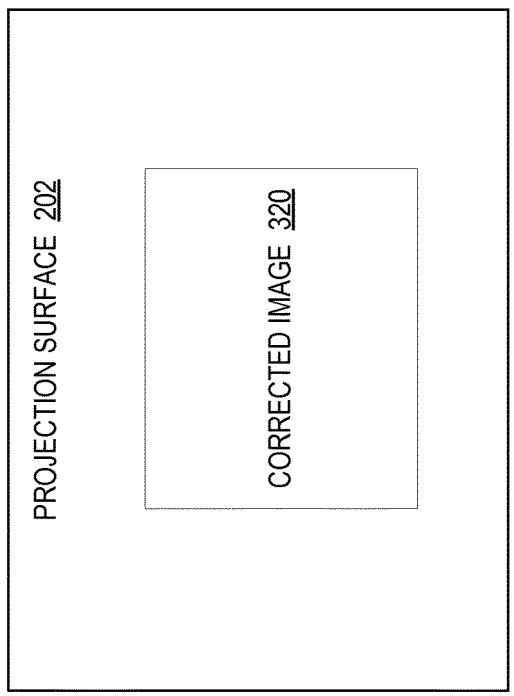
FIG. 3B shows a corrected image created by the handheld projection device, in accordance with some embodiments.
Figure 3A:
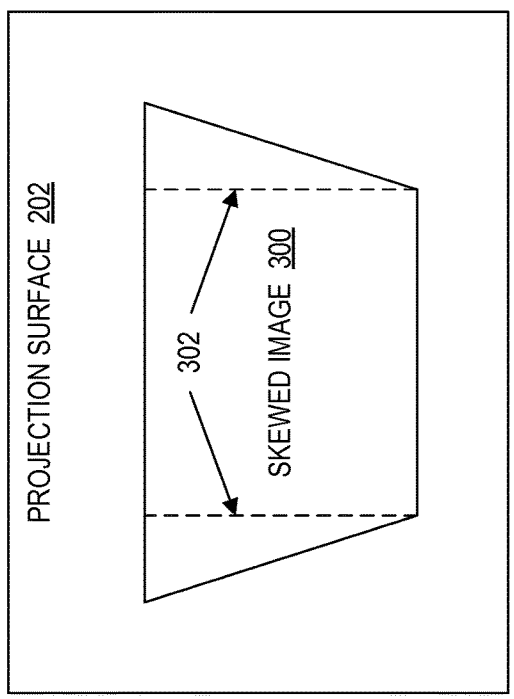
FIG. 3A shows a skewed image created by the handheld projection device, in accordance with some embodiments.

Referring now to FIGS. 3A and 3B, additional details will be provided regarding the operation of the skew correction module 114. In particular, FIGS. 3A and 3B show an illustrative sequence whereby the skew correction module 114 corrects image distortion caused when the handheld projection device 102 is tilted with respect to the projection screen 202. FIG. 3A shows a skewed image 300 created by the handheld projection device 102, in accordance with some embodiments. FIG. 3B shows a corrected image 320 created by the handheld projection device 102, in accordance with some embodiments.

In FIG. 3A, the handheld projection device 102 generates the skewed image 300 on the projection surface 202. The skewed image 300 may be similar to the shape of a trapezoid. Dotted lines 302 indicate edges of the proper projected image. The handheld projection device 102 may generate the skewed image 300 when the handheld projection device 102 is tilted with respect to the projection surface 202. In the example illustrated in FIG. 3A, the handheld projection device 102 may be tilted upward with respect to the projection surface 202. As a result, the skewed image 300 continuously widens from the bottom of the skewed image 300 to the top of the skewed image 300.

In FIG. 3B, the handheld projection device 102 generates the corrected image 320 on the projection surface 202. The handheld projection device 102 projects the corrected image 320 on the projection surface 202 such that the corrected image 320 displays the same as the proper projected image, even though the handheld projection device 102 has been tilted with respect to the projection surface 202. The corrected image 240 may represent a correction of the skewed image 300 according to the skew correction factor 132.

The skew correction module 114 may determine the skew correction factor 132 based on the tilt angle of the handheld projection device 102 as measured by the accelerometer 108. In particular, the skew correction factor 132 may compensate for the distortion caused by the tilt of the handheld projection device 102. The correction factor 132 may cause the scanning mirror unit 122 to reproduce a corresponding projected image in a manner that removes the trapezoidal skew in the skewed image 300. In the example illustrated in FIG. 3B, the skew correction module 114 may cause the scanning mirror unit 122 to increasingly compress (i.e., squeeze) the skewed image 300 from the bottom of the skewed image 300 to the top of the skewed image 300 in order to generate the corrected image 240. In this way, when the handheld projection device 102 projects the corrected image 240, the corrected image 240 appears properly displayed on the projection surface 202 even in light of the trapezoidal skew caused by the titled angle of the handheld projection device 102.

Referring to FIG. 4, additional details will be provided regarding the operation of the image stabilization module 112 and the skew correction module 114. In particular, FIG. 4A is a flow diagram illustrating an example method 400 for generating a projected image, such as the corrected image 240, in accordance with some embodiments. FIG. 4B is a flow diagram illustrating an example method 420 for generating a projected image, such as the corrected image 320, in accordance with some embodiments.

In FIG. 4A, the method 400 begins at operation 402, where the image stabilization module 112 receives movement measurements from the accelerometer 108. The movement measurements may include magnitude of acceleration and direction of acceleration as measured by the accelerometer 108. The method 400 then proceeds to operation 404, where the image stabilization module 112 determines the movement correction factor 130 based on the movement measurements. The method 400 then proceeds to operation 406, where the image stabilization module 112 causes the scanning mirror unit 122 to generate a projected image, such as the corrected image 240, according to the movement correction factor 130. In some embodiments, operations 402, 404, and 406 may operate in a continuous loop.

In FIG. 4B, the method 420 begins at operation 422, where the skew correction module 114 receives tilt angle measurements from the accelerometer 108. The method 420 then proceeds to operation 424, where the skew correction module 114 determines the skew correction factor 132 based on the tilt angle measurements. The method 420 then proceeds to operation 426, where the skew correction module 114 causes the scanning mirror unit 122 to generate a projected image, such as the corrected image 320, according to the skew correction factor 132. In some embodiments, operations 422, 424, and 426 may operate in a continuous loop.

Figure 5:
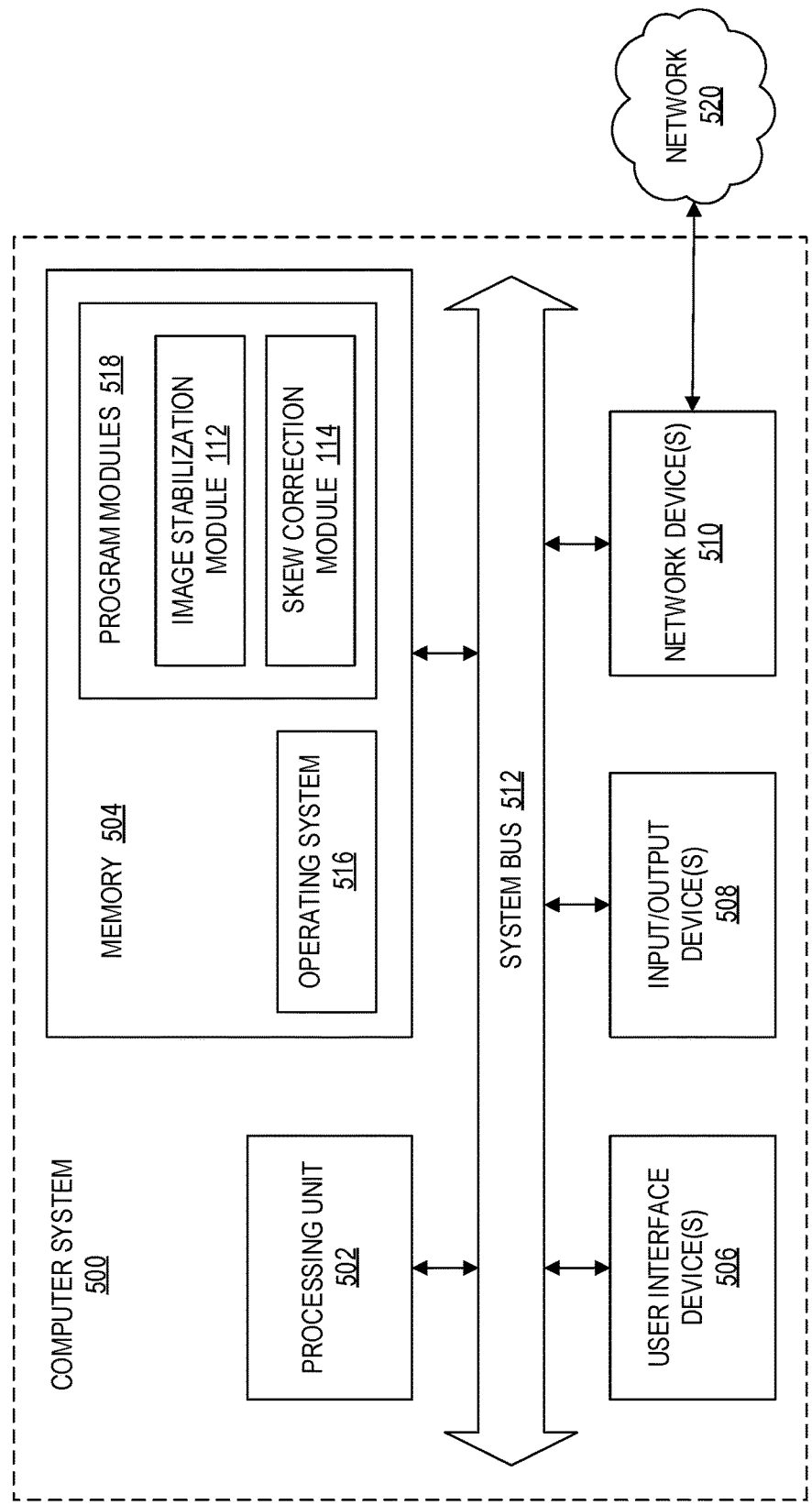
FIG. 5 is a block diagram illustrating an example computer system configured to provide image stabilization and skew correction, in accordance with some embodiments.

FIG. 5 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 5 is a block diagram illustrating a computer system 500 configured to generate a projected image, in accordance with embodiments. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 504 communicates with the processing unit 502 via the system bus 512. In one embodiment, the memory 504 is operatively connected to a memory controller (not shown) that enables communication with the processing unit 502 via the system bus 512. The memory 504 includes an operating system 516 and one or more program modules 518, according to exemplary embodiments. Examples of operating systems, such as the operating system 516, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system. The program modules 518 may include the image stabilization module 112 and the skew correction module 114. In some embodiments, the image stabilization module 112 and the skew correction module 114 are embodied in computer-readable media containing instructions that, when executed by the processing unit 502, performs the methods 400 and 420 respectively for generating a projected image, as described in greater detail above with respect to FIGS. 4A and 4B. According to embodiments, the program modules 518 may be embodied in hardware, software, firmware, or any combination thereof.

By way of example, and not limitation, computer-readable media may comprise non-transitory computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 518. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via the network 520. Examples of the network devices 510 may include, but are not limited to, a modem, a radio frequency ("RF") or infrared ("IR") transceiver, a telephonic interface, a bridge, a router, or a network card. The network 520 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 520 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method comprising:
   establishing, by a processor of a projection device, a baseline for the projection device when acceleration of the projection device above a threshold is undetected, wherein when the projection device is positioned at the baseline, the projection device projects an image at a first position on a surface, wherein the projection device is associated with a full field of view, and wherein the full field of view indicates an area where the projection device is capable of projecting images;
   detecting, by the processor, movement of the projection device, wherein the movement has an acceleration;
   determining, by the processor, whether the acceleration of the movement of the projection device detected is above the threshold;
   in response to determining that the acceleration of the movement of the projection device is above the threshold, determining, by the processor, a distance of the movement of the projection device from the baseline and a direction of the movement of the projection device from the baseline;
   determining, by the processor, based on the distance of the movement of the projection device from the baseline and the direction of the movement of the projection device from the baseline, a movement correction factor;
   generating, by the processor according to the movement correction factor, the image for projection at the first position on the surface as if the projection device is positioned at the baseline instead of projection of the image at a second position on the surface corresponding to the distance of the movement of the projection device from the baseline and the direction of the movement of the projection device from the baseline;
   determining, by the processor after the movement of the projection device from the baseline, whether projection of the image at the first position on the surface as if the projection device is positioned at the baseline is at least partially outside of the full field of view associated with the projection; and
   if projection of the image at the first position on the surface as if the projection device is positioned at the baseline is at least partially outside of the full field of view associated with the projection device, generating, by the processor, the image for projection at the second position on the surface corresponding to the distance of the movement of the projection device from the baseline and the direction of the movement of the projection device from the baseline instead of at the first position on the surface as if the projection device is positioned at the baseline.

2. The method of claim 1, wherein when the projection device is at the baseline, projection of the image at the first position on the surface by the projection device is within the full field of view associated with the projection device.

3. The method of claim 1, further comprising:
   receiving tilt angle measurements from an accelerometer within the projection device;
   determining whether the tilt angle measurements indicate an orientation of the projection device that causes trapezoidal skew;
   upon determining that the tilt angle measurements indicate the orientation of the projection device that causes trapezoidal skew, determining a skew correction factor based on the tilt angle measurements to compensate for the trapezoidal skew; and
   causing the projection device to generate the image according to the tilt angle measurements.

4. The method of claim 3, wherein the accelerometer comprises a three-axis accelerometer.

5. The method of claim 1, wherein the movement correction factor compensates for the distance of the movement of the projection device from the baseline and the direction of the movement of the projection device from the baseline.

6. A projection device comprising:
   a processor; and
   a memory that stores instructions that, when executed by the processor, cause the processor to perform operations comprising
      establishing a baseline for the projection device when acceleration of the projection device above a threshold is undetected, wherein when the projection device is positioned at the baseline, the projection device projects an image at a first position on a surface, wherein the projection device is associated with a full field of view, and wherein the full field of view indicates an area where the projection device is capable of projecting images,
      detecting movement of the projection device, wherein the movement has an acceleration,
      determining whether the acceleration of the movement of the projection device detected is above the threshold,
      in response to determining that the acceleration of the movement of the projection device is above the threshold, determining a distance of the movement of the projection device from the baseline and a direction of the movement of the projection device from the baseline,
      determining, based on the distance of the movement of the projection device from the baseline and the direction of the movement of the projection device from the baseline, a movement correction factor, generating, according to the movement correction factor, the image for projection at the first position on the surface as if the projection device is positioned at the baseline instead of projection of the image at a second position on the surface corresponding to the distance of the movement of the projection device from the baseline and the direction of the movement of the projection device from the baseline, determining, after the movement of the projection device from the baseline, whether projection of the image at the first position on the surface as if the projection device is positioned at the baseline is at least partially outside of the full field of view associated with the projection, and if projection of the image at the first position on the surface as if the projection device is positioned at the baseline is at least partially outside of the full field of view associated with the projection device, generating the image for projection at the second position on the surface corresponding to the distance of the movement of the projection device from the baseline and the direction of the movement of the projection device from the baseline instead of at the first position on the surface as if the projection device is positioned at the baseline.

7. The projection device of claim 6, wherein when the projection device is at the baseline, projection of the image at the first position on the surface by the projection device is within the full field of view associated with the projection device.

8. The projection device of claim 6, wherein the operations further comprise:
receiving tilt angle measurements from an accelerometer within the projection device;
determining whether the tilt angle measurements indicate an orientation of the projection device that causes trapezoidal skew;
upon determining that the tilt angle measurements indicate the orientation of the projection device that causes trapezoidal skew, determining a skew correction factor based on the tilt angle measurements to compensate for the trapezoidal skew; and
causing the projection device to generate the image according to the tilt angle measurements.

9. The projection device of claim 8, wherein the accelerometer comprises a three-axis accelerometer.

10. The projection device of claim 6, wherein the movement correction factor compensates for the distance of the movement of the projection device from the baseline and the direction of the movement of the projection device from the baseline.

11. A non-transitory computer-readable storage medium storing instructions that, when executed by a processor of a projection device, cause the processor to perform operations comprising:
establishing a baseline for the projection device when acceleration of the projection device above a threshold is undetected, wherein when the projection device is positioned at the baseline, the projection device projects an image at a first position on a surface, wherein the projection device is associated with a full field of view, and wherein the full field of view indicates an area where the projection device is capable of projecting images;
detecting movement of the projection device, wherein the movement has an acceleration;
determining whether the acceleration of the movement of the projection device detected is above the threshold;
in response to determining that the acceleration of the movement of the projection device is above the threshold, determining a distance of the movement of the projection device from the baseline and a direction of the movement of the projection device from the baseline;
determining, based on the distance of the movement of the projection device from the baseline and the direction of the movement of the projection device from the baseline, a movement correction factor;
generating, according to the movement correction factor, the image for projection at the first position on the surface as if the projection device is positioned at the baseline instead of projection of the image at a second position on the surface corresponding to the distance of the movement of the projection device from the baseline and the direction of the movement of the projection device from the baseline;
determining, after the movement of the projection device from the baseline, whether projection of the image at the first position on the surface as if the projection device is positioned at the baseline is at least partially outside of the full field of view associated with the projection; and
if projection of the image at the first position on the surface as if the projection device is positioned at the baseline is at least partially outside of the full field of view associated with the projection device, generating the image for projection at the second position on the surface corresponding to the distance of the movement of the projection device from the baseline and the direction of the movement of the projection device from the baseline instead of at the first position on the surface as if the projection device is positioned at the baseline.

12. The non-transitory computer-readable storage medium of claim 11, wherein when the projection device is at the baseline, projection of the image at the first position on the surface by the projection device is within the full field of view associated with the projection device.

13. The non-transitory computer-readable storage medium of claim 11, wherein the operations further comprise:
receiving tilt angle measurements from an accelerometer within the projection device;
determining whether the tilt angle measurements indicate an orientation of the projection device that causes trapezoidal skew;
upon determining that the tilt angle measurements indicate the orientation of the projection device that causes trapezoidal skew, determining a skew correction factor based on the tilt angle measurements to compensate for the trapezoidal skew; and
causing the projection device to generate the image according to the tilt angle measurements.

14. The non-transitory computer-readable storage medium of claim 13, wherein the accelerometer comprises a three-axis accelerometer.

* * * * *